(No Model.)
J. J. JOHNSTON.
MEAT VESSEL.
No. 265,609. Patented Oct. 10, 1882.
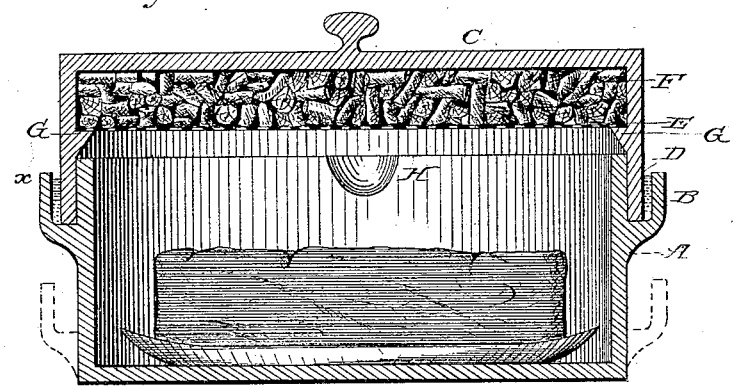
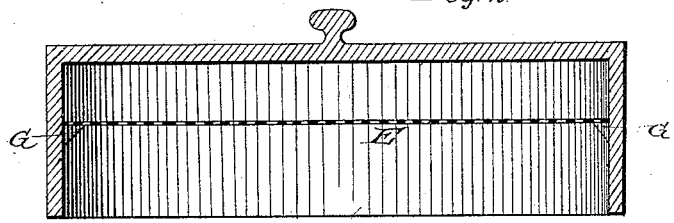
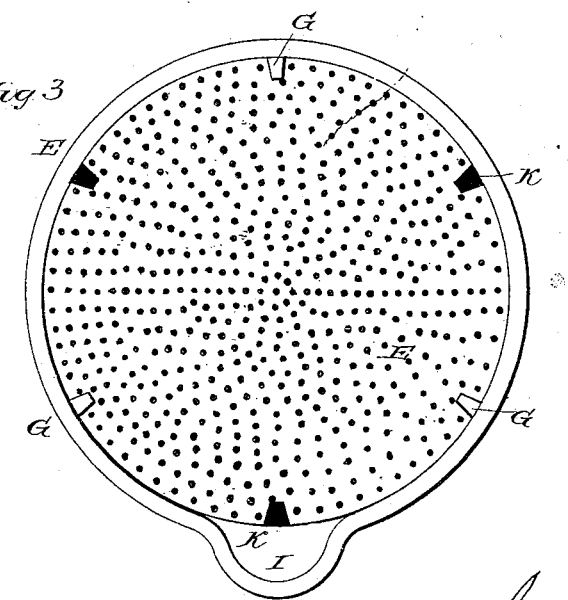
WITNESSES
Fred. G. Dieterich
Jno. H. Hockett
INVENTOR
James J. Johnston

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

MEAT-VESSEL.

SPECIFICATION forming part of Letters Patent No. 265,609, dated October 10, 1882.

Application filed February 11, 1882. (No model.)

*To all whom it may concern:*

Be it known that I, JAMES J. JOHNSTON, of Columbiana, in the county of Columbiana and State of Ohio, have invented a certain new and useful Improvement in Meat-Vessels; and I do hereby declare that the following is a full, clear, and exact description thereof, reference being had to the accompanying drawings, and to the letters of reference marked thereon.

My invention relates to an improvement in meat-vessels; and it consists in providing the body of the vessel with a grooved projection and the lid of the vessel with a flange fitted to and in said groove, and with a perforated diaphragm for supporting a layer of wood charcoal over the mouth of said vessel, the whole constructed, arranged, and operating as will hereinafter more fully and at large appear.

To enable others skilled in the art with which my invention is most nearly connected to make and use it, I will proceed to describe its construction and operation.

In the accompanying drawings, which form part of my specification, Figure 1 is a vertical and transverse section of my improvement in meat-vessels. Fig. 2 is a vertical and transverse section of the lid and its perforated diaphragm. Fig. 3 is an inverted view of the lid.

Reference being had to the accompanying drawings, A represents the body of the meat-vessel, surrounded with a grooved projection, B, and is furnished with a pouring-lip, H, the form and contour of which is shown in Figs. 1 and 3.

The lid C is provided with a flange, D, the contour of which corresponds to the contour of the groove in the projection B, with the lower edge resting on the bottom of said groove.

On the inner wall of the flange D are lugs G, adapted for supporting the perforated diaphragm E, which is furnished with recesses K, made in the periphery of said diaphragm, and so arranged that said lugs will pass through said recesses, and by slightly rotating the diaphragm it will rest upon the lugs G, as shown in Figs. 1 and 2.

The lid C is inverted, and a layer of charcoal placed in it. Then the diaphragm is placed over the charcoal and secured in position, as hereinbefore described. The meat is then placed in the vessel A and the lid placed on said vessel, with the flange D resting upon the bottom of the groove in the projection B and the groove filled with water, which water seals the vessel, thereby excluding air, insects, dust, and deleterious gases.

It is a well-ascertained fact that meat placed on or near charcoal will keep for a long period of time without becoming fetid or "spoiled." This is due to the fact that the charcoal throws off carbonic-acid gas and takes up the gases which have a tendency to render the meat fetid or spoil it; and it is also a well-known fact that when the charcoal is heated it throws off the gases it has taken up and is again operative for taking up gases and throwing off carbonic-acid gas. Hence a vessel constructed as hereinbefore described is well adapted to the preserving of fresh meats, and therefore will be a great desideratum to housekeepers.

It will be advisable, when placing a fresh supply of meat in the vessel A, to renew the properties hereinbefore described in the charcoal, which may be done by simply placing the lid on a heated stove until the charcoal attains a temperature of about 212° Fahrenheit, which is the ordinary boiling-point.

The vessel A and groove of the projection B are each provided with a pouring-lip, the advantage of which will be apparent without further description.

When it is desired to place the vessel in water for the purpose of keeping it cool (which is a common practice with farmers) the grooved projection B should be arranged on the vessel A, as indicated by the dotted lines in Fig. 1, and the depth of the flange D correspondingly increased. By such arrangement the vessel could be placed in water to about the line $x$.

Having thus described my improvement, what I claim is—

A meat-vessel having the body A surrounded with a grooved projection, B, and a lid, C, the flange D of which in form and contour corresponds to the form and contour in said grooved projection B, said lid being furnished with a perforated diaphragm, substantially as herein described, and for the purpose set forth.

JAMES J. JOHNSTON.

Witnesses:
A. C. JOHNSTON,
T. D. D. OURAND.